United States Patent
Genta

[15] 3,697,554
[45] Oct. 10, 1972

[54] FORMYLAMINOTHIOARYLOXYANTHRAQUINONES

[72] Inventor: Guido R. Genta, Lock Haven, Pa.
[73] Assignee: American Aniline Products, Inc.
[22] Filed: March 25, 1969
[21] Appl. No.: 810,363

Related U.S. Application Data

[63] Continuation-in-part of Ser. No. 582,062, Feb. 17, 1966, abandoned.

[52] U.S. Cl. .................................. 260/377, 8/39
[51] Int. Cl. ........................................ C09b 1/56
[58] Field of Search ............................... 266/377

[56] References Cited

UNITED STATES PATENTS 3,153,033  10/1964  Steiger ..................... 260/377

OTHER PUBLICATIONS

Smith, Open–Chain Nitrogen Compounds, Vol. I, p. 180 (1965)
Millar et al., A Shorter Sidgwick' s Org. Chem. of Nitrogen, p. 184 (1969)
Shriner et al., Chemical Reviews, 35, p. 381 (1944)

Primary Examiner—Lorraine A. Weinberger
Assistant Examiner—E. Jane Skelly
Attorney—James E. Armstrong and Olin E. Williams

[57] ABSTRACT

Anthraquinone dyestuffs containing a formylamino groups in the 1-position and a thioaryloxy group, such as a thiophenoxy group, in the 4-, 5-, or 8-position are made by reacting the appropriate 1-aminoanthraquinone with an organosulfonyl halide and dimethylformamide and heating the resulting intermediate in aqueous alkaline solution to form the 1-formylaminoanthraquinone. The products are excellent colors for polyester fibers, ranging from yellow to reddish-orange in shade.

5 Claims, No Drawings

FORMYLAMINOTHIOARYLOXYANTHRAQUINONES

RELATED APPLICATION

This application is a continuation-in-part of my copending application Ser. No. 582,062, filed Feb. 17, 1966, and now abandoned.

BACKGROUND OF THE INVENTION

Considerable effort has been expended in the dyestuffs industry in a search for suitable materials to color aromatic polyester fibers, in particular, polyethylenetherephthalate. Generally, the aromatic polyester fibers have a poor affinity for dyestuffs, since they do not readily absorb colorants from aqueous dispersions. As a result, it has been difficult to find dyes which are acceptable in all of the important physical properties of substantivity, light fastness, and resistance to sublimation. Many dyes which have passable affinity for polyester fibers and which color these materials yellow to orange shades having a reasonably satisfactory fastness to light, leave much to be desired with respect to their fastness to sublimation. Others are inferior from the standpoint of tinctorial strength or are limited in use by the method with which they can be effectively applied.

Thioaryloxyanthraquinones have been known for many years. It has been recently recognized in U.S. Pat. No. 3,163,436 that certain dyes of this class are good colorants for hydrophobic textile materials, such as polyethyleneterephthalate. Among the thioaryloxyanthraquinones disclosed in the patent are compounds having an acylamino group in the 1-position, such as 1 acetylamino- 4-tolymercaptoanthraquinone. Although such compounds give satisfactory results in most respects when applied to hydrophobic textile materials, the dyes made by my new process are unexpectely superior, particularly in their tinctorial strength and their resistance to sublimation.

SUMMARY

In accordance with the invention, I have discovered a new method of making anthraquinone dyes having the formula:

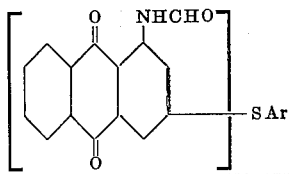

wherein Ar is a member selected from the group consisting of phenyl, lower alkylphenyl, lower alkoxy phenyl, halophenyl, benzyl, and halobenzyl. As shown in the above formula, the thioaryl radical can be located in any free position in the anthraquinone nucleus, although preferably it is in the 4, 5-, or 8-position thereof.

The dyes are made by reacting a 1-aminothioaryloxyanthraquinone of the formula:

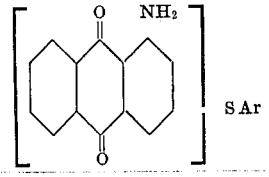

wherein Ar has the value give aforesaid, with an alkyl or arylsulfonyl chloride, such as methanesulfonyl chloride, in the presence of dimethylformamide. After filtering the reaction mixture, the cake thus obtained is reslurried and heated in aqueous alkaline solution. Upon heating, there is obtained the product 1-formylaminothioaryloxyanthraquinone.

DETAILED DESCRIPTION

Thioaryloxyanthraquinones useful as intermediates for the dyes of the invention include 1-amino-4-thiophenoxyanthraquone, 1-amino-4-(thio-p-cresoxy)anthraquinone, 1-amino-5-p-chlorothiphenoxyanthraquinone, 1-amino-8-p-ethoxythiophenoxyanthraquinone, 1-amino-5-benzylmercaptoanthraquinone, and the like.

Particularly useful organosulfonyl chlorides are those of the formula $RSO_2Cl$ wherein wherein R is lower alkyl and

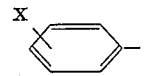

in which X is hydrogen, chlorine or lower alkyl. Especially useful benzene sulfonyl chloride and methanesulfonyl chloride.

In conducting the reaction between 1-aminothioaryloxyanthraquinones and the alkyl (or aryl) sulfonyl chloride at least one mole of sulfonyl chloride should be present for each mole of anthraquinone compound. The use of an excess of alkylsulfonyl chloride is often helpful in pushing the reaction to completion. The reaction is conducted in dimethylformamide which serves both as a coreactant and as a solvent medium for the reaction. The reaction is markedly exothermic; upon the addition of sulfonyl chloride there is a temperature rise of approximately 30°–60° C. The reaction mixture is maintained at a temperature between about 60° C. and the boiling point of the reaction mixture, preferably at a temperature of about 75–85° C.

Completion of the initial reaction ordinarily takes from 3–6 hours. The mass is then filtered and the crystals thus obtained, which are readily water-soluble, are dissolved in aqueous alkaline solution and heated to 40°–100° C.

Provided that the solution is alkaline, the pH is not particularly critical. A pH of 8–12 can be easily obtained by adding any conventional alkaline substance, such as soda ash, caustic or ammonia, in appropriate amounts, e.g., 1–5 percent by weight, based on the weight of the reaction mixture.

The product 1-formylaminothioaryloxyanthraquinone obtained upon heating is recovered as wet cake by filtration and is subsequently washed.

The dyestuffs of the invention can also be made by first preparing a 1-formylaminohaloanthraquinone and reacting this intermediate with thiophenol (or a thiophenol appropriately substituted according to the above formula) in the presence of caustic potash to give the 1-formylaminothioaryloxyanthraquinone.

The dyestuff is applied to textile fibers in the form of a dispersed color powder or paste, which is obtained by wet milling the dye in a conventional apparatus, such as a ball mill, with a dispersant, such as sodium lignin sulfonate; a wetting agent; and a suitable quantity of water. Sufficient diluent or standardizing agent is added to adjust the dyestuff to a standard strength. The dispersed cake or paste can also be spray dried or oven dried and thereafter micropulverized if desired. Sufficient dispersant and standardizing agents are added to give a dispersed powder generally containing between about 10–60 percent active (pure) dyestuff base. The dispersed powder, when added to water with or without auxiliary agents, forms a near colloidal aqueous dispersion in which the goods are dyed in the conventional manner.

My invention is further illustrated by the following examples.

EXAMPLE I

To a 500 ml flask equipped with heater, stirrer, thermometer, and reflux condenser, there were charged 300 g. dimethylformamide and 66 g. 1-amino-5-thiophenoxyanthraquinone. The reaction mass was stirred and 44 g. methanesulfonyl chloride was slowly dropped in. The temperature rose to 75°–80° C and was kept at 80°–85° C for a period of four hours. After cooling to 25°–30° C the reaction mass was filtered and the yellow crystals thus obtained were separated from the dimethylformamide. The crystals were reslurried in a solution of 15 g. of soda ash in 500 ml of water. The resulting mixture was heated to 50°–60° C, filtered, washed and kept in the form of a wet cake. The 248 g. of wet cake corresponded to 60 g. pure 1-formylamino-5-thiophenoxyanthraquinone; sulfur analysis, found 8.7 percent S, theory 8.9 percent S.

The 60 g. of pure dye as a 24 percent wet cake was ball milled for 24 hours with 14 g. sodium lignin sulfonate dispersant, available commercially as Marasperse N, 14 g. wetting agent, and 184 g. water.

The 22 paste thus obtained dye "Dacron" polyester fiber in reddish orange shades with excellent resistance to sublimation and excellent light fastness by both the standard carrier dyeing and thermofixation methods.

EXAMPLE II

To the 500 ml flask equipped as described in Example I there were charged 150 g. dimethylformamide, 33 1-amino-4thiophenoxyanthraquinone g. 1-amino-4-thiophenoxyanthraquinone and 22 g. methanesulfonyl chloride. The resulting mixture was heated at 80°–90° C for 4 hours and cooled to room temperature overnight. The mixture was filtered and the filter cake thus obtained was reslurried in 500 ml water containing 10 g. soda ash and heated to 50°–60° C. The product 1-formylamino- 4-thiophenoxyanthraquinone was recovered by filtration and washed alkali free with cold water. There was thus obtained 132 g. wet cake containing 25 g. pure dyestuff.

The dyestuff was standardized as described in Example I as a 18 ½ percent paste. It dyed "Dacron" polyester fiber in a reddish orange shade having very good sublimation properties and excellent light fastness.

EXAMPLE III

An intermediate for the dyes of the invention was prepared by charging to the 500 cc flask equipped as described in Example I 150 g. dimethylformamide, 26 g. 1-amino-5-chloroanthraquinone and 15 g. methanesulfonyl chloride. The reaction mixture was heated for six hours at 80°–90° C, cooled to room temperature, and filtered. The cake thus obtained was boiled in a 4 percent aqueous solution of soda ash, cooled and filtered to give 24 g. of 1-formylamino-5-chloroanthraquinone melting at 246°–248° C, chlorine analysis 12 percent.

EXAMPLES IV to X

By reacting the intermediate of Example III with the aryl mercaptans shown below in Table I the following results are obtained.

TABLE I

| Example No. | Reactant | Product | Fastness on Polyester | |
|---|---|---|---|---|
| | | | Light | Sublimation |
| IV | p-chlorothiophenol | 1-formylamino-5-(p-chlorothiophenoxy-anthraquinone | excellent | excellent |
| V | p-bromothiophenol | 1-formylamino-5-(p-bromothiophenoxy)-anthraquinone | excellent | very good |
| VI | p-methylthiophenol | 1-formylamino-5-(p-thiocresoxy)-anthraquinone | excellent | excellent |
| VII | mixed thio-oxylenols | 1-formylamino-5 (thioxylyloxy)-anthraquinone | excellent | very good |
| VIII | benyl-mercaptan | 1-formylamino-5 (benzylmercapto)-anthraquinone | excellent | excellent |
| IX | p-chlorobenzyl-mercaptan | 1-formylamino-5 chlorobenzylmercapto) anthraquinone | excellent | excellent |
| X | p-methoxy-thiophenol | 1-formylamino-5(p-methoxythiophenoxy)-anthraquinone | excellent | very good |

I claim:

1. Method of making a 1-formylaminothioaryloxyanthraquinone of the formula:

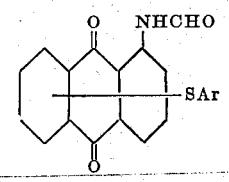

wherein -SAr is attached to the 4, 5-, or 8-position and Ar is a member selected from the group consisting of phenyl, lower alkylphenyl, halophenyl, lower alkoxyphenyl, benzyl, and halobenzyl comprising:

a. reacting an anthraquinone compound of the formula:

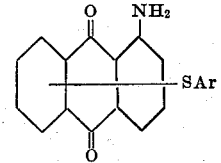

wherein -SAr is attached to the 4-, 5-, or 8-position and Ar is as defined aforesaid with at least one mole of an organosulfonyl chloride of the formula RSO₂Cl, in which R is lower alkyl or

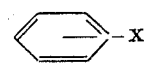

in which X is hydrogen, chloro, or lower alkyl in dimethylformamide solution at a temperature between 60° C. and the boiling point of the solution,
b. separating the crystals thus formed from the mother liquor,
c. heating said crystals in aqueous alkaline solution to a temperature of 40°–100° C., and
d. recovering the 1formylaminothioaryloxyanthraquinone from the reaction mixture.

2. Method according to claim 1 in which the initial reaction in dimethylformamide solution is conducted at a temperature of 75°–85° C.

3. Method according to claim 1 wherein the starting anthraquinone compound is 1amino-5-thiophenoxyanthraquinone and the product is 1-formylamino- 4. Method according to claim 1 wherein the starting anthraquinone compound is -thiophenoxyanthraquinone and the product is 1-formylamino-4-thiophenoxyanthraquinone.

5. Method of making a 1-formylamiothioaryloxyanthraquinone of the formula:

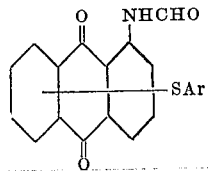

wherein -SAr is attached to the 4-, 5-, or 8-position and Ar is a member selected from the group consisting of phenyl, lower alkylphenyl, halophenyl, lower alkoxyphenyl, benzyl, and halobenzyl comprising:
a. reacting a 1-aminohaloanthraquinone wherein the halo group is attached to 4-, 5-, or 8-position with at least one mole of an organosulfonyl chloride of the formula RSO$_2$Cl, in which R is lower alkyl or

in which X is hydrogen, chloro, or lower alkyl in dimethylformamide solution at a temperature between 60° C. and the boiling point of the solution;
b. separating the crystals thus formed from the mother liquor;
c. heating said crystals in aqueous alkaline solution to a temperature of 40°–100° C.;
d. separating the 1-formylaminohaloanthraquinone from the mother liquor; and
e. subjecting the 1-formylaminohaloanthraquinone to the reaction of a thiophenol of the formula S-Ar, wherein Ar is as defined aforesaid; and
f. recovering the 1-formylaminothioaryloxyanthraquinone from the reaction mixture.

* * * * *